US011939189B2

(12) United States Patent
Munoz Sotoca

(10) Patent No.: US 11,939,189 B2
(45) Date of Patent: Mar. 26, 2024

(54) FRICTIONLESS ELECTRONIC SAFETY ACTUATOR

(71) Applicant: Otis Elevator Company, Farmington, CT (US)

(72) Inventor: Javier Munoz Sotoca, Madrid (ES)

(73) Assignee: OTIS ELEVATOR COMPANY, Farmington, CT (US)

(*) Notice: Subject to any disclaimer, the term of this patent is extended or adjusted under 35 U.S.C. 154(b) by 0 days.

(21) Appl. No.: 17/985,655

(22) Filed: Nov. 11, 2022

(65) Prior Publication Data

US 2024/0051794 A1 Feb. 15, 2024

(30) Foreign Application Priority Data

Aug. 10, 2022 (EP) .................................... 22382776

(51) Int. Cl.
*B66B 5/18* (2006.01)
*B66B 5/04* (2006.01)

(52) U.S. Cl.
CPC ................ *B66B 5/18* (2013.01); *B66B 5/044* (2013.01)

(58) Field of Classification Search
CPC .................................. B66B 5/18; B66B 7/044
See application file for complete search history.

(56) References Cited

U.S. PATENT DOCUMENTS

| | | | | |
|---|---|---|---|---|
| 2007/0051563 A1* | 3/2007 | Oh | B66B 5/06 | 187/371 |
| 2019/0248628 A1 | 8/2019 | Dube | | |
| 2020/0115189 A1 | 4/2020 | Dube | | |
| 2023/0139867 A1* | 5/2023 | Pu | B66B 5/18 | 187/372 |

FOREIGN PATENT DOCUMENTS

| | | | |
|---|---|---|---|
| DE | 102016218635 A1 * | 3/2018 | B66B 5/18 |
| DE | 102019106627 A1 * | 9/2020 | |
| EP | 3604196 A1 * | 2/2020 | B66B 1/32 |
| WO | WO-2017090145 A1 * | 6/2017 | B66B 5/18 |

OTHER PUBLICATIONS

Machine Translation of DE 10 2016 218 635.*
European Search Report for application EP 22382776.7, dated Jan. 19, 2023, 36 pages.

* cited by examiner

*Primary Examiner* — Diem M Tran
(74) *Attorney, Agent, or Firm* — CANTOR COLBURN LLP

(57) ABSTRACT

A frictionless electronic safety actuator (100; 202), for use in an elevator system, includes a magnetic plate (104); an electromagnet (102); a linkage (136); a biasing arrangement (106); and a path-constraining arrangement (112). The linkage (136) is actuatable so as to move a safety brake (204) into frictional engagement with an elevator guide rail (206). The linkage (136) is attached to the magnetic plate (104) and is moveable between a first position in which the linkage (136) is actuated and a second position in which the linkage (136) is not actuated. The biasing arrangement (106) is arranged to apply a biasing force to the magnetic plate (104) to bias the magnetic plate (104) towards the first position.

14 Claims, 6 Drawing Sheets

FRICTIONLESS ELECTRONIC SAFETY ACTUATOR

FOREIGN PRIORITY

This application claims priority to European Patent Application No. 22382776.7, filed Aug. 10, 2022, and all the benefits accruing therefrom under 35 U.S.C. § 119, the contents of which in its entirety are herein incorporated by reference.

TECHNICAL FIELD

The present disclosure relates to frictionless electronic safety actuators for use in an elevator system.

BACKGROUND

It is known in the art to mount safety brakes onto elevator components moving along guide rails, to bring the elevator component quickly and safely to a stop, especially in an emergency. In many elevator systems the elevator car is hoisted by a tension member with its movement being guided by a pair of guide rails. Typically, a governor is used to monitor the speed of the elevator car. According to standard safety regulations, such elevator systems must include an emergency braking device (known as a safety brake, "safety gear" or "safety") which is capable of stopping the elevator car from moving downwards, even if the tension member breaks, by gripping a guide rail. Safety brakes may also be installed on the counterweight or other components moving along guide rails.

Electronic Safety Actuators (ESA's) are now commonly used instead of using mechanical governors to trigger a safety brake. ESA's typically activate a safety brake by dragging a magnet (either a permanent magnet or an electromagnet) against the guide rail, and using the friction resultant therefrom to pull up on a linkage attached to the safety brake. The reliance on the friction interaction between a magnet and the guide rail has a number of potential complexities, especially in high-rise elevator systems, as the interaction between the magnet and the guide rail causes wear on the guide rail, and can induce chipping, as well as debris accumulation.

To address these and other issues, frictionless electronic safety actuators may be used. In frictionless electronic safety actuators, a different mechanism other than a friction interaction between a magnet and the guide rail is used to actuate the safety brake. For example, in some frictionless electronic safety actuators, a spring force is used to pull on a linkage that engages a safety brake. However, after the safety brake has been engaged, the frictionless electronic safety actuator needs to be reset to return the linkage and the safety brake to their non-actuated positions.

There is a need to provide a reliable and convenient reset mechanism for such frictionless electronic safety actuators.

SUMMARY

According to a first aspect of this disclosure, there is provided a frictionless electronic safety actuator for use in an elevator system, comprising: a magnetic plate; an electromagnet; a linkage that is actuatable so as to move a safety brake into frictional engagement with an elevator guide rail, wherein the linkage is attached to the magnetic plate, and wherein the magnetic plate is moveable between a first position in which the linkage is actuated and a second position in which the linkage is not actuated; and a biasing arrangement arranged to apply a biasing force to the magnetic plate to bias the magnetic plate towards the first position; wherein the electromagnet is operable to selectively produce a magnetic force which acts upon the magnetic plate in a first direction towards the electromagnet and which is sufficient to overcome the biasing force to move the magnetic plate away from the first position; and wherein the frictionless electronic safety actuator further comprises a path-constraining arrangement that constrains a path of movement of the magnetic plate such that when the magnetic force acts upon the magnetic plate, the magnetic plate is constrained such that the magnetic plate moves from the first position to the second position along the path of movement, wherein the second position is displaced relative to the first position in a direction that has a component perpendicular to the first direction.

This aspect of the disclosure extends to an elevator system comprising a guide rail, an elevator car, a frictionless electronic safety actuator and a safety brake, wherein the frictionless electronic safety actuator and the safety brake are mounted to the elevator car to move along the guide rail with the elevator car in use; wherein the electronic safety actuator comprises: a magnetic plate; an electromagnet; a linkage that is actuatable so as to move the safety brake into frictional engagement with the elevator guide rail, wherein the linkage is attached to the magnetic plate, and wherein the magnetic plate is moveable between a first position in which the linkage is actuated and a second position in which the linkage is not actuated; and a biasing arrangement arranged to apply a biasing force to the magnetic plate to bias the magnetic plate towards the first position; wherein the electromagnet is operable to selectively produce a magnetic force which acts upon the magnetic plate in a first direction towards the electromagnet and which is sufficient to overcome the biasing force to move the magnetic plate away from the first position; and wherein the frictionless electronic safety actuator further comprises a path-constraining arrangement that constrains a path of movement of the magnetic plate such that when the magnetic force acts upon the magnetic plate, the magnetic plate is constrained such that the magnetic plate moves from the first position to the second position along the path of movement, wherein the second position is displaced relative to the first position in a direction that has a component perpendicular to the first direction.

It will be appreciated that, according to the present disclosure, although the magnetic force acting on the magnetic plate is in the first direction, towards the electromagnet, owing to the path-constraining arrangement, the magnetic plate does not move parallel to the first direction when moving under the magnetic force. Instead, it is caused to move partly in a direction perpendicular to the first direction because it is constrained to move from the first position to the second position, which has a component of displacement in the perpendicular direction relative to the first position. In other words, owing to the path-constraining arrangement, when the magnetic plate moves towards the electromagnet in response to the magnetic force, a component of movement of the magnetic plate in the first direction gives rise to a component of movement perpendicular to the first direction.

The provision of the path-constraining arrangement therefore means that the electromagnet can be used to move the magnetic plate in a direction having a component perpendicular to the direction of the magnetic force generated by the electromagnet. It is therefore possible to use the electromagnet to reset the safety brake using a magnetic force that may be substantially perpendicular to the direction of movement of the linkage that is required to reset the safety brake. For example, the linkage may be actuatable and resettable by vertical movements (e.g. parallel to the guide rail), while the electromagnet may be oriented to apply a horizontal magnetic force (e.g. perpendicular to the guide rail). In such an example, the path-constraining arrangement prevents the magnetic plate moving only in a horizontal direction (i.e. with no vertical component). Instead, in order to move closer to the electromagnet under the magnetic force, the magnetic plate must also undergo some vertical movement owing to being constrained to a path defined by the path-constraining arrangement. This vertical movement can then be used to reset the linkage.

This possibility to create movement in a direction perpendicular to the applied magnetic force allows more freedom in the arrangement (e.g. position, orientation, etc.) of the electromagnet relative to the other components of the frictionless electronic safety actuator.

It will also be appreciated that the presence of a biasing arrangement to bias the magnetic plate to the first position means that the linkage can be actuated through control of the electromagnet, e.g. by switching off the electromagnet or by using the electromagnet to repel the magnetic plate. The frictionless electronic safety actuator thus provides actuation for a safety brake without the aid of frictional contact between the electronic safety actuator and the guide rail. This provides the advantage that actuation of the safety brake is not affected by the state of the elevator guide rail, so any potential debris from the elevator hoistway or dirt from the elevator guide rail will not interfere with the actuation of the frictionless electronic safety actuator. Further, the location of the frictionless electronic safety actuator is not restricted by the need for contact with the guide rail during actuation, and can be positioned anywhere on an elevator component where the linkage can then actuate the safety brake. In some examples no component of the frictionless electronic safety actuator comes into frictional contact with the elevator guide rail.

It will be understood by the skilled person that the path-constraining arrangement can be any suitable arrangement to cause the magnetic plate to move between the first position and the second position, and whilst certain examples of types of path-constraining arrangement are disclosed herein, these are by way of example only.

In some examples, the path-constraining arrangement comprises a stiff member (e.g. a metal bar or plastic rod, a stiff spring, etc.), wherein a first point on the stiff member is pivotally connected to a first pivot that is fixed relative to the magnetic plate and a second point on the stiff member is pivotally connected to a second pivot that is fixed relative to the electromagnet. For example, a first point (e.g. at a first end) of the stiff member may be pivotally connected to the magnetic plate and a second point (e.g. at a second end) of the stiff member may be pivotally connected to a frame on which the electromagnet is fixedly mounted.

The path-constraining arrangement may comprise two or more stiff members (e.g. two or more bars, rods, or stiff springs), wherein a first point on each stiff member is pivotally connected to a respective first pivot that is fixed relative to the magnetic plate and a second point on each stiff member is pivotally connected to a respective second pivot that is fixed relative to the electromagnet. For example, a first point (e.g. at a first end) of each stiff member may be pivotally connected to the magnetic plate and a second point (e.g. at a second end) of each stiff member may be pivotally connected to a frame on which the electromagnet is fixedly mounted.

A respective distance between the first point and the second point on each respective stiff member may be the same for each stiff member. Each stiff member may have a respective elongate axis extending through the first and second points of the respective stiff member, wherein the elongate axes of the stiff members are parallel.

In some examples, the path-constraining arrangement comprises first and second stiff members, e.g. as described above, wherein the first and second stiff members are arranged such that the first and second points on the first stiff member and the first and second points on the second stiff member are each located at a respective vertex of a parallelogram shape. In such examples, the stiff members (or the respective elongate axes thereof) may define two opposing sides of the parallelogram shape. An internal angle of the parallelogram shape may vary as the magnetic plate moves between the first position and the second position.

As used herein, the term "stiff" means that the member has a sufficient degree of stiffness to constrain the path of the magnetic plate. The stiff members may be rigid but this is not essential.

In the examples given above, a fixed distance between the first and second points on the stiff member(s) constrains the path of movement of the magnetic plate by fixing a radial distance of the first point on the or each stiff member relative to the respective second pivot that is fixed relative to the electromagnet, i.e. the first point on the or each stiff member is constrained to follow a path corresponding to an arc of a circle as the magnetic plate moves from the first position to the second position.

However, it is not essential for the path-constraining arrangement to comprise one or more stiff members as described above. As a non-limiting example, path-constraining arrangement may comprise a pin-and-slot arrangement. The path-constraining arrangement may comprise one or more pins attached to (or otherwise fixed relative to) the magnetic plate, wherein each pin moves in a slot that defines the path from the first position to the second position. The slot may have the shape of a circle arc, but other slot shapes are possible including curves and straight lines. The path-constraining arrangement may comprise a cam arrangement.

The path-constraining arrangement may define a path that the magnetic plate follows when it moves from the first position to the second position, such that movement in the first direction gives rise to some movement perpendicular to the first direction, e.g. such that horizontal movement of the magnetic plate gives rise to vertical movement of the magnetic plate and thus to vertical movement of the linkage.

The first position and the second position may be located such that the range of movement of the magnetic plate when it moves between the first position and the second position corresponds to a range of movement of the linkage required to actuate the linkage and engage the safety brake in use.

The first position and the second position may be located such that when the magnetic plate moves from the first position to the second position, it moves a component of distance x parallel to the first direction and a component of distance y perpendicular to the first direction, such that the ratio x:y is at least 1:1, e.g. at least 1:2, e.g. at least 1:3, e.g. at least 1:4.

The first and second positions, and thus the ratio x:y, may be defined by the path-constraining arrangement, e.g. by the configuration and/or dimensions thereof. For example, in the example of the parallelogram shape arrangement, the length of the stiff members and the angle of the stiff members when the magnetic plate is in the first and second positions will determine the arc that the magnetic plate follows when moving between the first and second positions.

In some examples, the path-constraining arrangement may be configured such that a small displacement parallel to the first direction (e.g. a horizontal direction) results in a large movement perpendicular to the first direction (e.g. in a vertical direction) for the actuation of the linkage. This may be particularly suitable for some configurations of elevator components and their safety brakes that may have space constraints. It may also be helpful in reducing the strength or reach requirements of the electromagnet. For example, a less powerful electromagnet may be required to attract the magnetic plate through a smaller displacement parallel to the first direction. This may obviate any need to move the electromagnet towards the magnetic plate to attract it. In some examples, the electromagnetic is fixed relative to a frame or housing of the frictionless electronic safety actuator.

As discussed above, the provision of a biasing arrangement allows the frictionless electronic safety actuator to be actuated to engage the safety brake by removing the magnetic field or applying a magnetic field to repel the magnetic plate from the electromagnetic. It will be understood from the present disclosure that when the magnetic plate is released or repelled from the electromagnetic, the biasing arrangement causes the magnetic plate to move from the second position to the first position, thereby actuating the linkage. It will also be understood that the path-constraining arrangement also constrains the path of the movement of the magnetic plate when it moves from the second position to the first position, i.e. in addition to actuating the linkage, the biasing arrangement together with the path-constraining arrangement causes the magnetic plate to move away from the electromagnet such that there is a separation between the magnetic plate and the electromagnet. The frictionless electronic safety actuator is then ready to be reset as described above, i.e. the electromagnet can be used to move the magnetic plate to close the separation, which also creates the perpendicular movement that resets the linkage.

It is to be understood that when it is said that the magnetic plate is "biased" towards the first position, this means that when the magnetic plate is not subject to the magnetic field or any other external forces besides the biasing force, the biasing arrangement causes the magnetic plate to move to the first position.

The biasing arrangement may comprise or consist of a resilient member, e.g. a spring. Other biasing arrangements are possible, and some non-limiting examples of other possible biasing arrangements include a magnetic biasing arrangement, a hydraulic biasing arrangement, pneumatic springs, rubber springs, coil springs, a bent piece of metal.

In some examples, the biasing force is a pulling force, e.g. the biasing arrangement may be a resilient member under tension. A pulling force may provide a more reliable actuation of the linkage.

The biasing arrangement may apply the biasing force (e.g. a pulling force) directly to the magnetic plate. The biasing arrangement may be connected directly to the magnetic plate.

The magnetic plate may comprise any suitable magnetic material. In some examples the magnetic plate does not have any permanent magnetism. The magnetic plate may comprise or consist of a ferromagnetic material, e.g. iron.

The magnetic plate may be oriented in a plane perpendicular to the first direction. For example, the electromagnetic may attract the magnetic plate in a direction normal to the magnetic plate's surface. The biasing force may act in a direction that is parallel to the magnetic plate's surface or in a direction which has a component (e.g. its largest component) that is parallel to the magnetic plate's surface. The linkage may have a direction of actuation (i.e. the direction in which the linkage must be pulled or pushed to actuate it) that is parallel to the magnetic plate's surface or which has a component (e.g. its largest component) that is parallel to the magnetic plate's surface.

For example, the magnetic plate may be oriented vertically and the magnetic force may act horizontally. The biasing force and/or the linkage's actuation direction may be oriented vertically or substantially vertically.

The magnetic plate may remain in the same orientation when it moves between the first and second positions, e.g. the path-constraining arrangement may be configured to achieve this, e.g. by having two stiff members or two pin-in-slot arrangements.

The magnetic plate may substantially or fully overlap with the electromagnet both when the magnetic plate is in the first position and when the magnetic plate is in the second position. In the context, "overlap" means that an envelope of the magnetic plate's surface when viewed in the first direction overlaps with an envelope of the electromagnet when viewed from the first direction.

The linkage may be actuated by a movement perpendicular to the first direction, to push or pull the safety brake into engagement with the elevator rail. In other examples the linkage may be actuated by a movement in a direction having a component (e.g. its largest component) perpendicular to the first direction so as to move the safety brake into frictional engagement with the elevator guide rail.

The linkage may be actuated by a vertical movement to push or pull the safety brake into engagement with the elevator rail. The first direction (i.e. the direction in which the magnetic force acts on the magnetic plate) may be a horizontal direction. As used herein, when a direction or orientation is described as "vertical" or "horizontal", this refers to the direction or orientation when the frictionless electronic safety actuator is installed in an elevator system, e.g. "vertical" may mean parallel to the guide rail and "horizontal" may be perpendicular to the guide rail.

The linkage may be directly attached to the magnetic plate.

In some examples, the electromagnet is operable to reverse the magnetic field in order to displace the magnetic plate from the electromagnet and/or to remove the magnetic field to allow the magnetic plate to be displaced from the electromagnet by the biasing arrangement. It will be appreciated that this can mean a triggering of the frictionless electronic safety actuator.

In some examples, the magnetic plate comprises at least one permanent magnet. The linkage may be actuated by generating a reversed magnetic field (i.e. in a direction opposite to the first direction) to repel the permanent magnet from the electromagnet, so that the biasing arrangement can move the magnetic plate into the first position. By using at least one permanent magnet it will be appreciated that the power requirement for the frictionless electronic safety actuator can be greatly reduced, as continuous power is not required to retain the magnetic plate in the second position (i.e. wherein the linkage is not actuated). Instead only a small amount of power is required to generate the reversed magnetic field. The attractive magnetic force between the permanent magnet and the electromagnet when no current is running through the electromagnet may be greater than a biasing force of the biasing arrangement. The permanent magnet may be positioned such that the permanent magnet or at least part of the permanent magnet overlaps with the electromagnet. In this context, “overlap” means that the permanent magnet or at least part of the permanent magnet is contained in an envelope of the electromagnet when viewed from the first direction.

The electromagnet may comprise a magnetic core (e.g. an iron core), wherein the magnetic core may be shaped to have a first end and a second end that are both facing the magnetic plate, e.g. a C-shaped magnetic core. In examples in which the magnetic plate comprises a permanent magnet, the path-constraining arrangement may be configured such that in use the permanent magnet is positioned and remains between the first and second ends of the magnetic core in a direction perpendicular to the first direction during movement of the magnetic plate between the first and second positions. This may help to direct the magnetic flux of the permanent magnet towards the ends of the electromagnet, which may help the electromagnet to exert magnetic forces on the permanent magnet more efficiently.

In the examples where the magnetic plate comprises at least one permanent magnet, the arrangement is similar to that of many traditional ESA systems (albeit with actuation now taking place in a frictionless way). This means that existing ESA layouts can be retained. It will be appreciated that the operation of the at least one electromagnet may also be similar to that of many traditional ESA systems and so may allow for an easy upgrade to a frictionless ESA as disclosed herein.

In some examples, the linkage may be actuated by removing the magnetic field to release the magnetic plate from the electromagnet so that the biasing arrangement can move the magnetic plate into the first position. As the biasing arrangement biases the magnetic plate towards the first position (i.e. in which the linkage is actuated), in examples in which the magnetic plate does not comprise a permanent magnet, whenever the magnetic field is removed, the magnetic plate automatically moves to the first position, actuating the linkage and engaging the safety brake. Such examples may thus provide a failsafe mechanism, i.e. wherein the safety brake is automatically engaged when power to the electromagnet is lost.

In some examples, the at least one electromagnet is operable to produce a magnetic field to repel the magnetic plate. It will be appreciated that when the magnetic plate additionally comprises at least one permanent magnet a magnetic field is required to move the magnetic plate from the second position to the first position. This can be aided by the biasing force of the biasing arrangement, so as to efficiently actuate the linkage.

In some examples, after the magnetic field is used to move the magnetic plate from the first position to the second position, the electromagnet is kept powered on so that the magnetic plate is retained in the second position by the electromagnet, which attracts the magnetic plate. In some examples in which the magnetic plate comprises a permanent magnet, after the magnetic field is used to move the magnetic plate from the first position to the second position, the electromagnet is switched off and the magnetic plate is retained in the second position by the permanent magnet which attracts the electromagnet.

The magnetic plate may be in physical contact with the electromagnet when the magnetic plate is in the second position.

The present disclosure extends to a braking assembly for an elevator car, comprising: a frictionless electronic safety actuator as disclosed above; and a safety brake; wherein the linkage is connected to the safety brake such that when the linkage is actuated, the safety brake is moved into frictional engagement with an elevator guide rail guiding movement of the elevator car.

DRAWING DESCRIPTION

Certain preferred examples of this disclosure will now be described, by way of example only, with reference to the accompanying drawings, in which.

DETAILED DESCRIPTION

Figure 1:
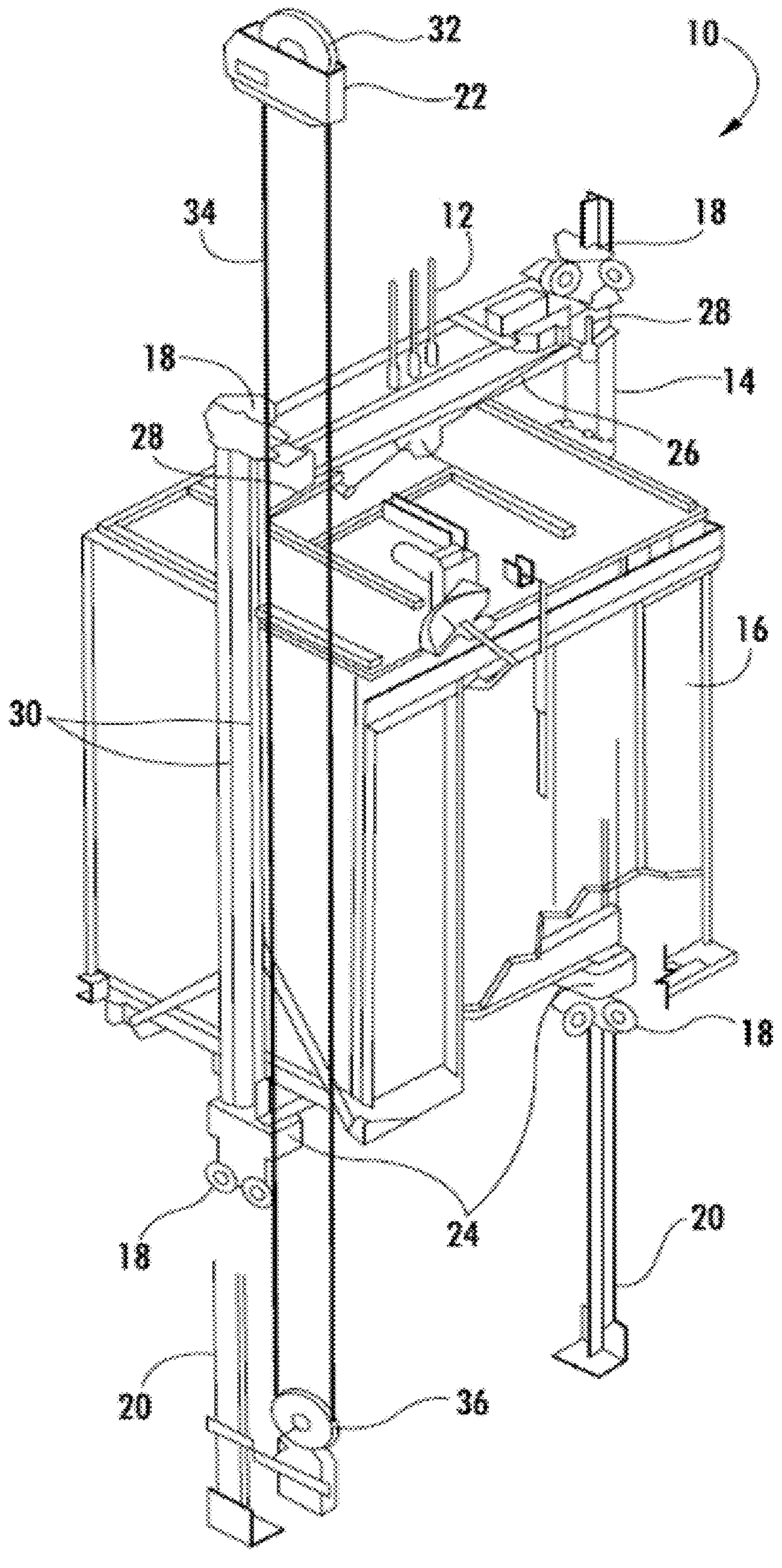
FIG. 1 shows an example of an elevator system employing a mechanical governor.

FIG. 1 shows an elevator system, generally indicated at 10. The elevator system 10 includes cables or belts 12, a car frame 14, an elevator car 16, roller guides 18, guide rails 20, a governor 22, and a pair of safety brakes 24 mounted on the elevator car 16. The governor 22 is mechanically coupled to actuate the safety brakes 24 by linkages 26, levers 28, and lift rods 30. The governor 22 includes a governor sheave 32, rope loop 34, and a tensioning sheave 36. The cables 12 are connected to the car frame 14 and a counterweight (not shown) inside a hoistway. The elevator car 16, which is attached to the car frame 14, moves up and down the hoistway by a force transmitted through the cables or belts 12 to the car frame 14 by an elevator drive (not shown) commonly located in a machine room at the top of the hoistway. The roller guides 18 are attached to the car frame 14 to guide the elevator car 16 up and down the hoistway along the guide rails 20. The governor sheave 32 is mounted at an upper end of the hoistway. The rope loop 34 is wrapped partially around the governor sheave 32 and partially around the tensioning sheave 36 (located in this example at a bottom end of the hoistway). The rope loop 34 is also connected to the elevator car 16 at the lever 28, ensuring that the angular velocity of the governor sheave 32 is directly related to the speed of the elevator car 16.

In the elevator system 10 shown in FIG. 1, the governor 22, a machine brake (not shown) located in the machine room, and the safety brakes 24 act to stop the elevator car 16 if it exceeds a set speed as it travels inside the hoistway. If the elevator car 16 reaches an over-speed condition, the governor 22 is triggered initially to engage a switch, which in turn cuts power to the elevator drive and drops the machine brake to arrest movement of the drive sheave (not shown) and thereby arrest movement of elevator car 16. If, however, the elevator car 16 continues to experience an overspeed condition, the governor 22 may then act to trigger the safety brakes 24 to arrest movement of the elevator car 16 (i.e. an emergency stop). In addition to engaging a switch to drop the machine brake, the governor 22 also releases a clutching device that grips the governor rope 34. The governor rope 34 is connected to the safety brakes 24 through mechanical linkages 26, levers 28, and lift rods 30. As the elevator car 16 continues its descent, the governor rope 34, which is now prevented from moving by the actuated governor 22, pulls on the operating levers 28. The operating levers 28 actuate the safety brakes 24 by moving the linkages 26 connected to the lift rods 30, and the lift rods 30 cause the safety brakes 24 to engage the guide rails 20 to bring the elevator car 16 to a stop.

It will be appreciated that, whilst a roped elevator is described here, the examples of an electronic safety actuator described here will work equally well with a ropeless elevator system e.g. hydraulic systems, systems with linear motors, and other ropeless elevator designs.

Whilst mechanical speed governor systems are still in use in many elevator systems, others are now implementing electronically actuated systems to trigger the emergency safety brakes 24. Most of these electronically actuated systems utilize use friction between a magnet and the guide rail 20 to then mechanically actuate a linkage to engage the safety brakes 24. Examples of an electronic safety actuator are disclosed herein which do not utilize friction against the guide rail 20 to actuate the safety brakes 24.

Figure 2:
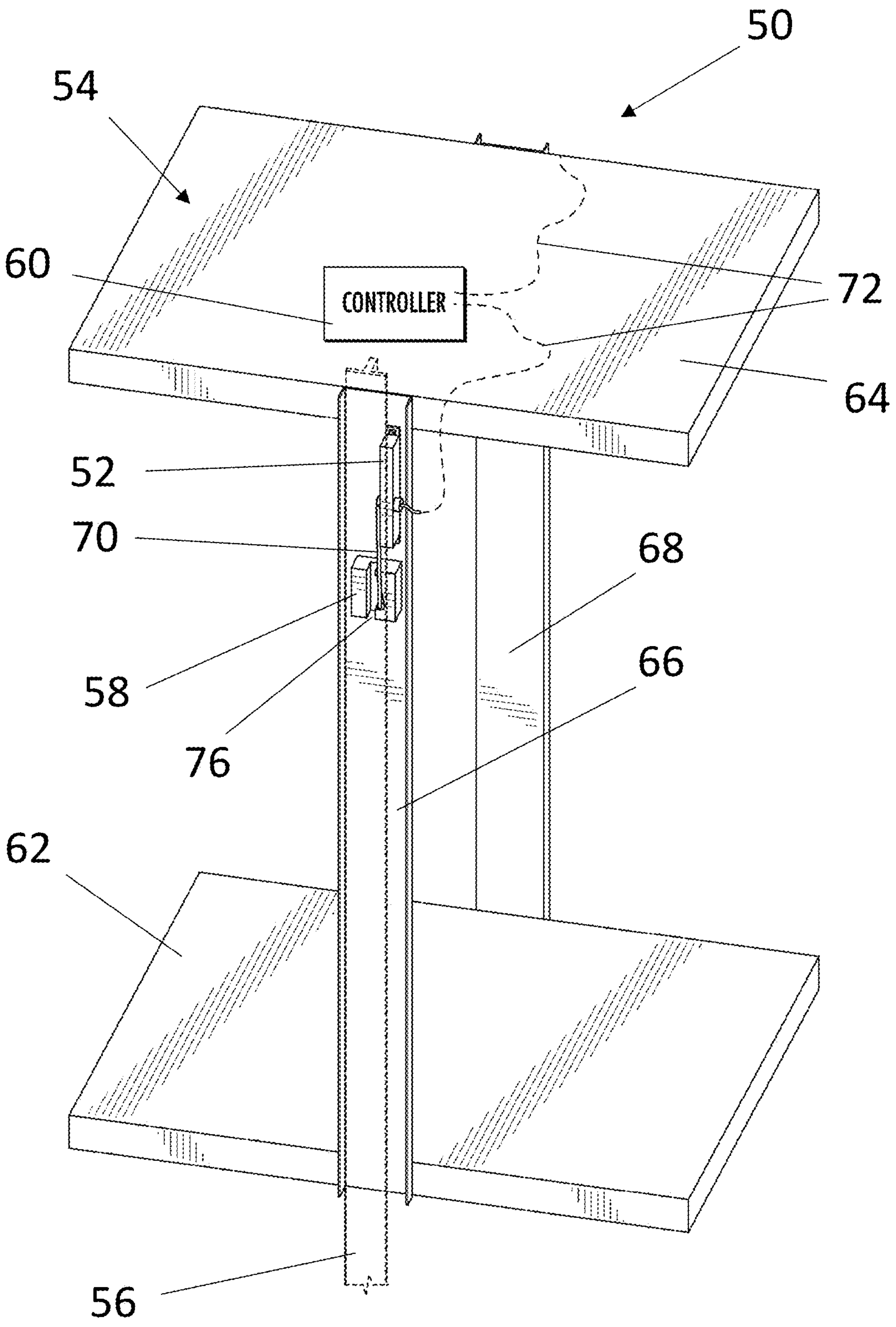
FIG. 2 shows an example of an elevator system employing a frictionless electronic safety actuator.

FIG. 2 shows an example of an elevator system 50 employing a frictionless electronic safety actuator 52. The elevator system 50 comprises the frictionless electronic safety actuator 52, an elevator car 54, two guide rails 56, a safety brake 58, and a controller 60. For clarity, one of the guide rails 56 is shown in dotted outline and the other guide rail is omitted from FIG. 2.

The elevator car 54 comprises a platform 62, a ceiling 64, a first structural member 66 and a second structural member 68. The first and second structural members 66, 68 may be referred to as "uprights". The elevator car 54 also comprises panels and other components forming walls of the elevator car 54, but those panels and other components are omitted from FIG. 2 for clarity.

The frictionless electronic safety actuator 52 and the safety brake 58 are mounted on the first structural member 66. The frictionless electronic safety actuator 52 is mechanically connected to the safety brake 58 via a linkage 70. A second electronic safety actuator and a second safety brake are provided on the second structural member, but these are omitted for clarity. The controller 60 is mounted in the ceiling 64 and is in communication with the frictionless electronic safety actuator 52 via connections 72.

The safety brake 58 has a slot 76 which accommodates the guide rail 56. The frictionless electronic safety actuator 52 is positioned above the safety brake 58 and adjacent to the guide rail 56, although other positions are possible, e.g. the frictionless electronic safety actuator 52 may be in a position that is not adjacent to the guide rail 56 as it may operate without requiring frictional contact with the guide rail 56 during its operation. In use, the elevator car 54 moves up and down the guide rails 56. In the event that the safety brake 58 needs to be engaged (e.g. in an elevator car overspeed situation), the controller 60 sends a signal to the frictionless electronic safety actuator 52 to engage the safety brake 58. In response to the signal, an actuation mechanism in the frictionless electronic safety actuator 52 exerts a pulling force on the linkage 70. The pulling force is transmitted via the linkage 70 to the safety brake 58, pulling the safety brake 58 into frictional engagement with the guide rail 56, bringing the elevator car 54 to a stop.

The frictionless electronic safety actuator 52 may, for example, operate in accordance with one of the example frictionless electronic safety actuators described below with reference to FIGS. 3A to 3C and 4.

Figure 3A:
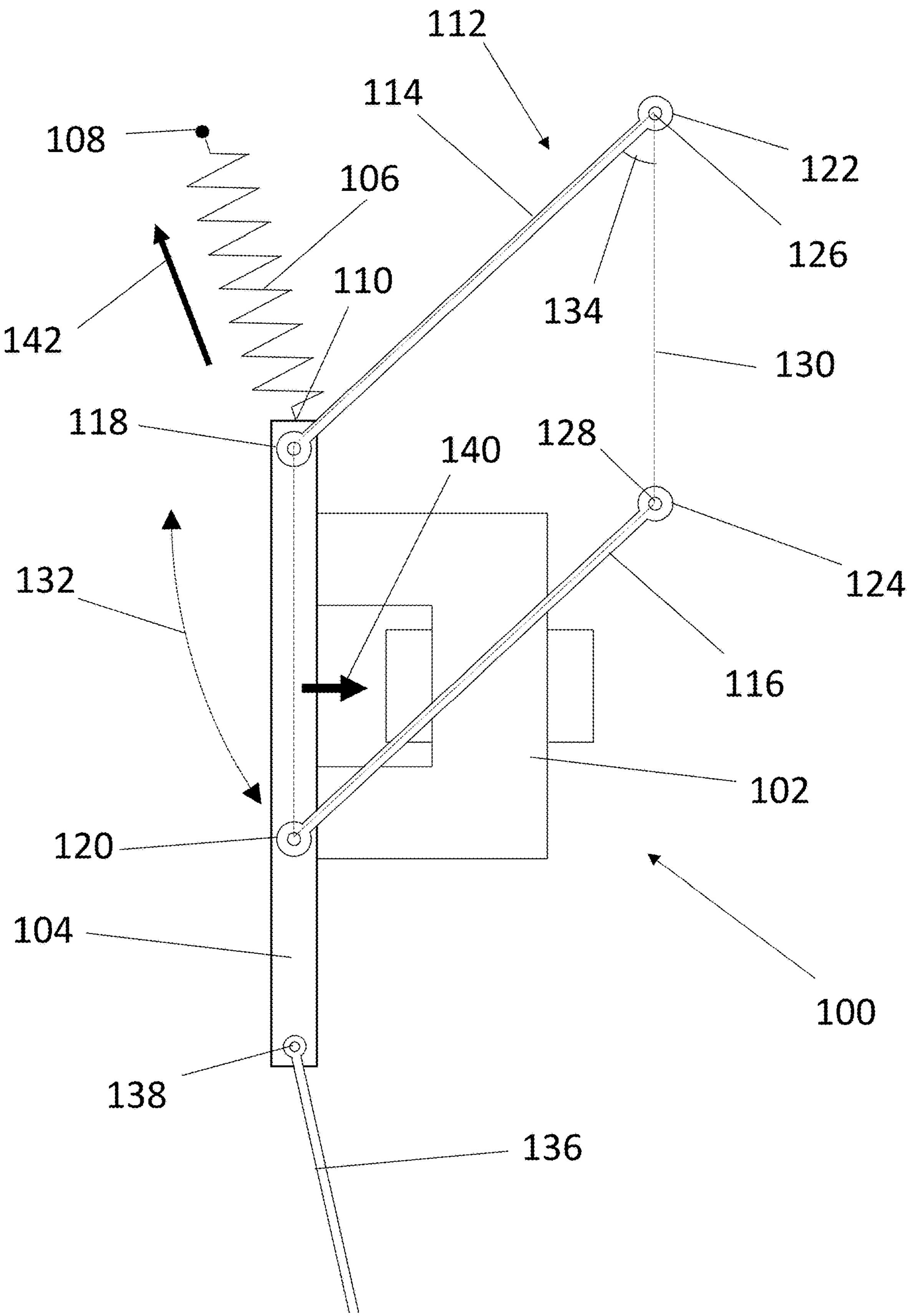
FIG. 3A shows a side on schematic of a frictionless electronic safety actuator during normal operation of an elevator according to a first example.
Figure 3B:
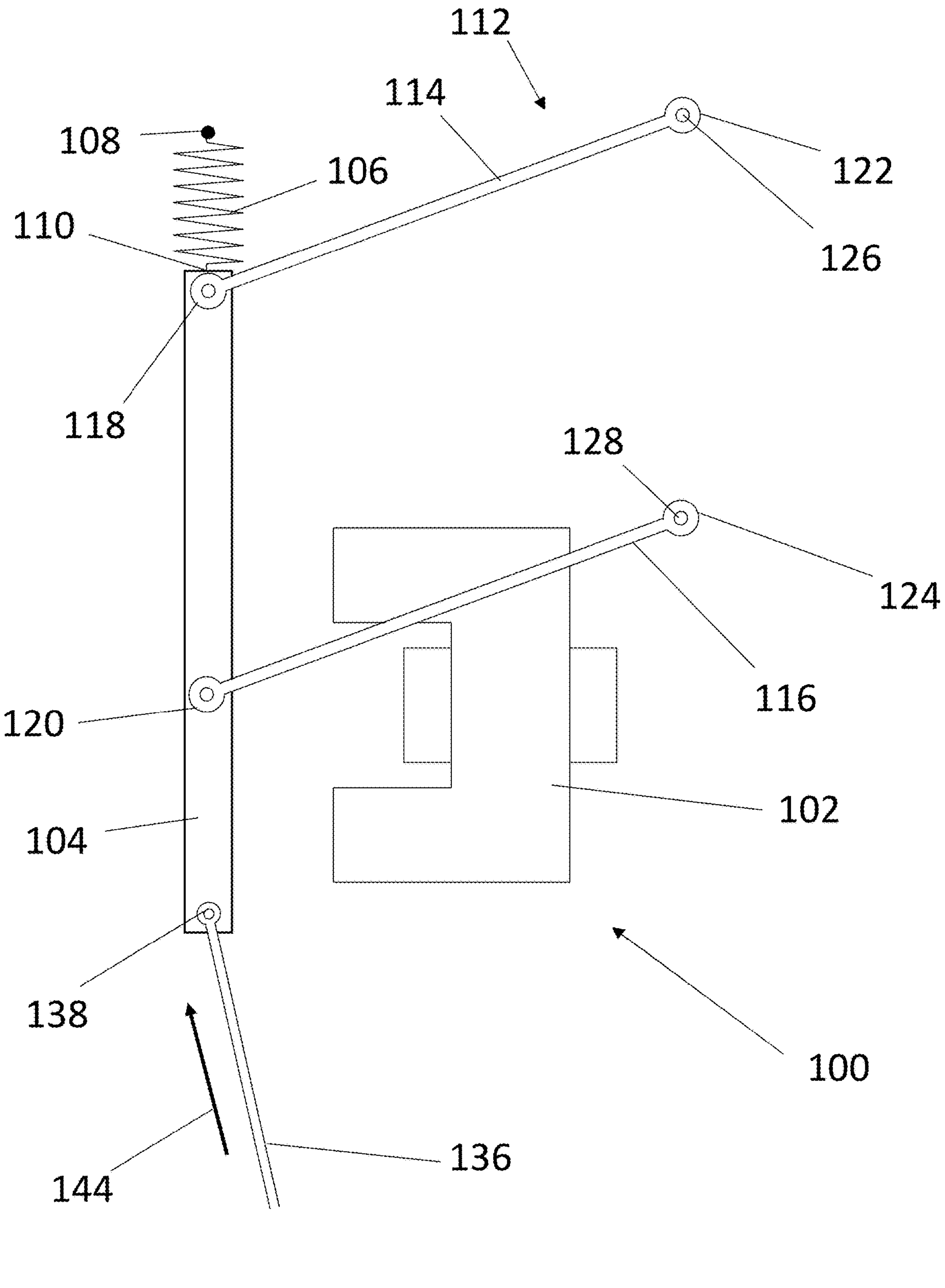
FIG. 3B shows a side on schematic of a frictionless electronic safety actuator in an actuated position according to the first example.
Figure 3C:
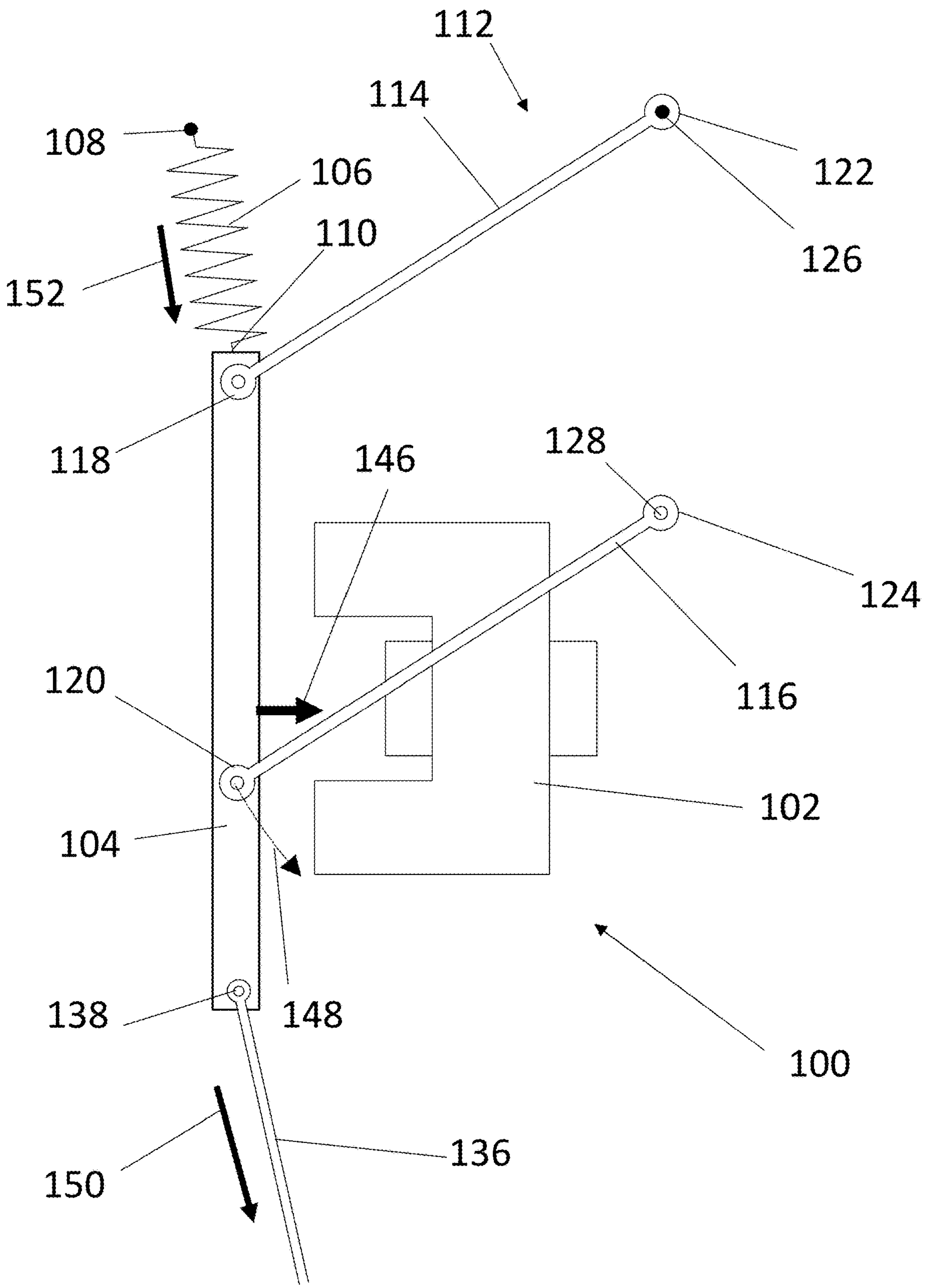
FIG. 3C shows a side on schematic of a frictionless electronic safety actuator during a reset process according to the first example.

FIG. 3A shows a first example of a frictionless electronic safety actuator 100 during normal elevator operation, FIG. 3B shows the first example of the frictionless electronic safety actuator 100 in an actuated position, and FIG. 3C shows the first example of the frictionless electronic safety actuator 100 during a reset process.

The frictionless electronic safety actuator 100 comprises an electromagnet 102, a magnetic plate 104, and a biasing arrangement. In this example, the biasing arrangement is a biasing spring 106, although other biasing arrangements may be used in this and other examples, e.g. a magnetic biasing arrangement, a hydraulic biasing arrangement, pneumatic springs, rubber springs, coil springs, a bent piece of metal, etc. In this example, the magnetic plate 104 is made of iron, but other materials are possible. The electromagnet 102 is fixedly mounted to a frame (not shown). A first end 108 of the spring 106 is fixedly attached to the frame. A second end 110 of the spring 106 is attached to the magnetic plate 104. The magnetic plate 104 is moveable with respect to the frame and the electromagnet 102.

The frictionless electronic safety actuator 100 also comprises a path-constraining arrangement 112. The path-constraining arrangement 112 comprises two rods 114, 116. In this example the rods are rigid, but as noted above this is not essential. A respective first end 118, 120 of each rod 114, 116 is pivotally connected to the magnetic frame and a respective second end 122, 124 of each rod 114, 116 is pivotally connected to a respective fixed point 126, 128 on the frame.

The rods 114, 116 are therefore positioned to define two opposing sides of a parallelogram shape, as depicted by the dotted outline 130. Owing to the pivotal connections between the rods 114, 116 and the magnetic plate 104 and between the rods 114, 116 and the frame, the magnetic plate 104 can move between a first position (as depicted in FIG. 3B) and a second position (as depicted in FIG. 3A). The rods 114, 116 constrain the movement of the magnetic plate 104 such that it moves along an arc of a circle (as illustrated by the dotted arrow 132) whose radius is defined by the length of the rods 114, 116. When the magnetic plate 104 moves, an interior angle 134 of the parallelogram changes.

The frictionless electronic safety actuator 100 also comprises a linkage 136 which is pivotally attached at a first end thereof to a connection point 138 on the magnetic plate 104. A second end of the linkage 136 is attached to a safety brake (not shown in FIGS. 3A to 3C but depicted in and discussed below with reference to FIG. 4), such that when the linkage 136 is pulled upwards, the safety brake is engaged.

The actuation and reset of the frictionless electronic safety actuator 100 will now be described with reference to FIGS. 3A, 3B and 3C.

FIG. 3A shows the frictionless electronic safety actuator 100 during normal operation of the elevator, i.e. when the safety brake is not engaged.

In this state, a current is being supplied to the electromagnet 102 so that it generates a magnetic field which exerts a force on the magnetic plate 104 in a horizontal direction as shown by the arrow 140. The force acts on the magnetic plate 104 to attract it to the electromagnet 102, holding the magnetic plate 104 in the position shown in FIG. 3A (referred to herein as the "second position").

The magnetic force is sufficient to hold the magnetic plate 104 in the second position against a biasing force applied by the spring 106. The spring 106 has a natural length such that when the magnetic plate 104 is held in the second position, the spring 106 is stretched and under tension. The spring 106 therefore exerts a pulling biasing force in the direction shown by the arrow 142. As can be seen from FIG. 3A, the biasing force is substantially vertical, i.e. substantially perpendicular to the magnetic force.

When it is determined (e.g. by a governor as described with reference to FIG. 1) that the safety brake should be engaged, the electromagnet 102 is switched off. In this example, the magnetic plate 104 is made of iron (i.e. it has no permanent magnetism). The magnetic plate 104 is therefore no longer attracted to the electromagnet 102 because the electromagnet 102 is not generating a magnetic field. There is therefore no longer any force to overcome the biasing force of the spring 106. The magnetic plate 104 therefore moves under the biasing force of the spring 106.

However, owing to the presence of the two rods 114, 116, the magnetic plate 104 cannot move in a straight line in the direction of the biasing force (i.e. in the direction of the arrow 142). Instead, the magnetic plate 104 follows the arc shown by the arrow 132. This moves the magnetic plate 104 into a new position (shown in FIG. 3B). The position shown in FIG. 3B is referred to herein as the "first position".

Referring now to FIG. 3B, it can be seen that to reach the first position, the magnetic plate 104 has moved vertically towards the spring 106. The vertical movement of the magnetic plate 104 pulls upwards on the linkage 136 because it is attached to the magnetic plate 104. The upward pull on the linkage 136 is transmitted to the safety brake, which is engaged by the upward pull of the linkage 136, as shown by the arrow 144. The first position shown in FIG. 3B therefore corresponds to an actuated state of the linkage 136 and an engaged state of the safety brake.

In addition to the vertical movement of the magnetic plate 104, owing to the fact that it is constrained to the path of the circle arc, the magnetic plate 104 has also moved horizontally, away from the electromagnet 102, creating a separation between the magnetic plate 104 and the electromagnet. This puts in the magnetic plate 104 into a position where the electromagnet can be used to reset the safety brake, as discussed below.

After the safety brake has been engaged as required, it is necessary to reset the linkage 136 and the safety brake so that the elevator can resume normal operation. The reset is initiated by switching the electromagnet 102 back on.

When the electromagnet 102 is switched back on, a magnetic force is generated in the direction of the arrow 146 which attracts the magnetic plate 104 to the electromagnet 102, as shown in FIG. 3C. However, owing to the rods 114, 116 that constrain the movement of the magnetic plate 104 to the arc of a circle, the magnetic plate 104 cannot move in a horizontal straight line towards the electromagnetic. Instead, the magnetic plate 104 moves along the circle arc (shown by the dotted arrow 148) in a direction that brings the magnetic plate 104 closer to the electromagnet 102.

As the magnetic plate 104 is constrained to move along the circle arc, the movement along the arc that brings the magnetic plate 104 closer to the electromagnetic includes a component of vertical motion such that the magnetic plate 104 also moves downwards.

As can be seen in FIG. 3C, this downward movement of the magnetic plate 104 pushes the linkage 136 back downwards in the direction of the arrow 150. The magnetic plate 104 continues to move along the circle arc until it makes physical contact with the electromagnet 102, i.e. arriving back in the second position. The resulting downwards movement of the linkage 136 is transmitted to the safety brake which disengages the safety brake, i.e. such that the safety brake is reset. It can thus be seen that the path-constraining arrangement 112 provided by the two rods 114, 116 makes it possible to generate a movement in a substantially vertical direction to reset the linkage 136 using a magnetic force that is horizontal, i.e. in a direction substantially perpendicular to the direction of movement required to reset the linkage 136.

As can also be seen in FIG. 3C, the magnetic force on the magnetic plate 104 overcomes the biasing force of the spring 106, and stretches the spring 106 in the direction of the arrow 152 so that it is under tension again.

The frictionless electronic safety actuator 100 is thus reset to the non-actuated state as shown in FIG. 3A and is ready to be actuated again when needed.

Figure 4:
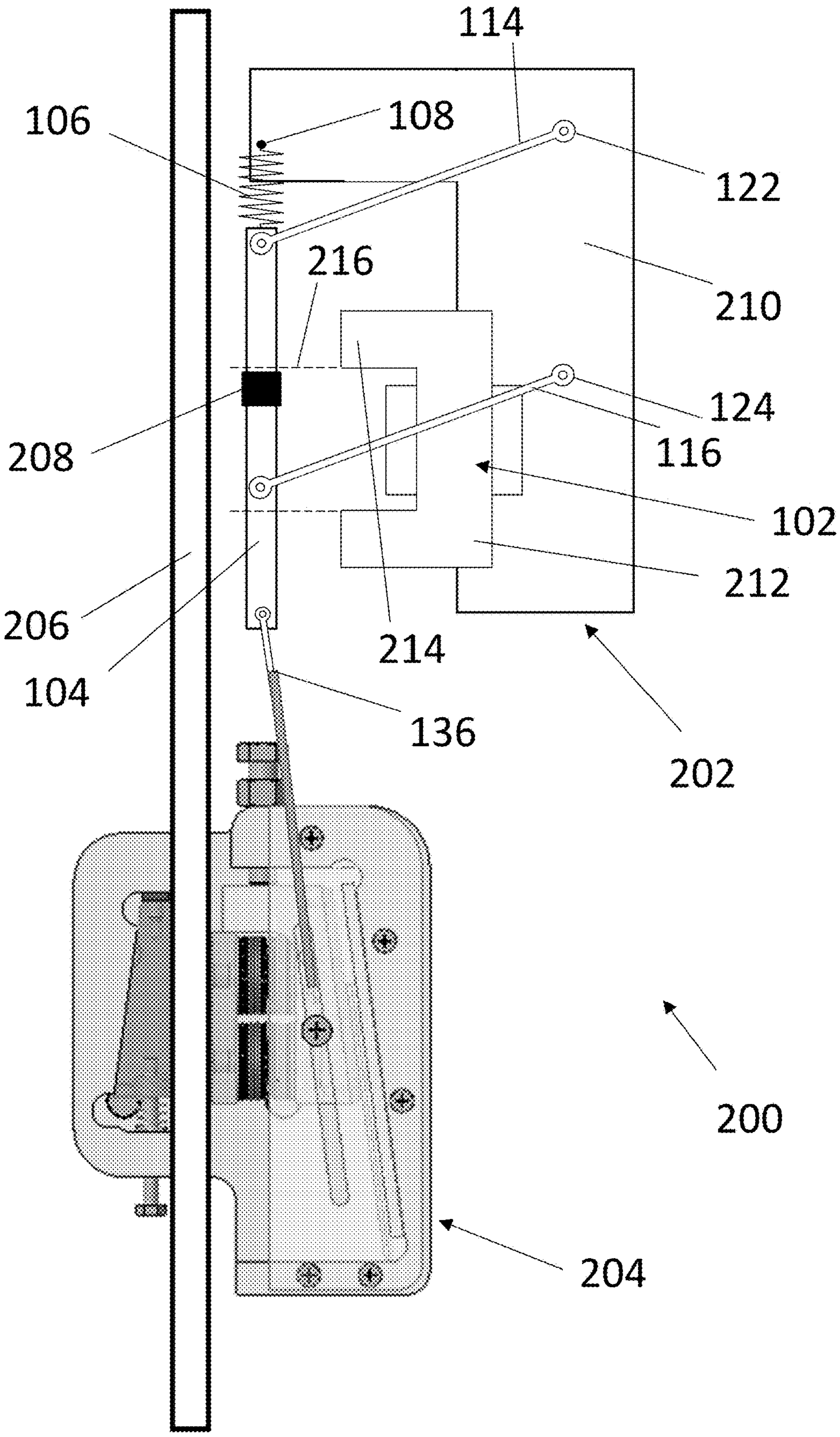
FIG. 4 shows a side on schematic of a frictionless electronic safety actuator connected to an elevator safety brake in an actuated position according to a second example.

FIG. 4 shows an example of a safety braking assembly 200 comprising an example of a frictionless electronic safety actuator 202 in accordance with the present disclosure and a safety brake 204. The frictionless electronic safety actuator 202 is situated adjacent a guide rail 206 of an elevator system. The frictionless electronic safety actuator 202 is positioned above the safety brake 204, which is in an actuated position such that the safety brake 204 is frictionally engaged with the guide rail 206.

The frictionless electronic safety actuator 100 as depicted in FIGS. 3A to 3C could be used in the safety braking assembly 200, but in this example the frictionless electronic safety actuator 202 is a second example of a frictionless electronic safety actuator in accordance with the present disclosure. The frictionless electronic safety actuator 202 has the same features as the frictionless electronic safety actuator 100 as depicted in FIGS. 3A to 3C (and so the same reference numerals are used to label corresponding features), except that the magnetic plate 104 comprises a permanent magnet 208. The linkage 136 is shown attached at one end to the magnetic plate 104, and at the other end to the safety brake 204. FIG. 4 also shows a frame plate 210 of the frictionless electronic safety actuator 202, to which the electromagnet 102, the respective second ends 122, 124 the of the rods and the first end 108 of the spring 106 are attached.

The permanent magnet 208 provided in this example acts to aid the attraction of the magnetic plate 104 to the electromagnet 102. In this example constant current is not required in the electromagnet 102 during normal operation of the elevator, and the electromagnet 102 is only operated to provide a force actuate and reset the safety brake 204.

The electromagnet 102 comprises an iron core 212, which has a C-shape such that the ends 214 of the electromagnet 102 are angled at 90° to the middle portion of the iron core 212 so that the ends 214 both face the magnetic plate 104. The rods 114 and 116 are arranged so that the vertical position of the permanent magnet 208 remains between the ends 214 of the iron core 212, i.e. within the region delimited by the dotted lines 216 shown in FIG. 4. This helps to direct the magnetic flux of the permanent magnet 208 towards the ends 214 of the iron core 212 to help the electromagnet 102 attract and repel the permanent magnet 208.

In the example of FIG. 4, to actuate the frictionless electronic safety actuator 202, the electromagnet 102 is supplied with a current in a direction to generate a magnetic field that repels the permanent magnet 208. Once the magnetic plate 104 with the permanent magnet 208 is displaced from the electromagnet 102, the magnetic plate 104 moves into the first position under the biasing force applied by the spring 106, actuating the linkage 136 and the safety brake 204.

To reset the frictionless electronic safety actuator 202, the electromagnet 102 is switched on to attract the permanent magnet 208 and the magnet plate, thereby pulling the magnetic plate 104 back to the second position. Once the magnetic plate 104 has returned to the second position the electromagnet 102 can be turned off. The permanent magnet 208 attracts the electromagnet with sufficient force to retain the magnetic plate 104 in the second position. This reduces the amount of power required to operate the frictionless electronic safety actuator 202, which improves operational efficiency of the system.

In the examples of FIGS. 3A to 3C and 4, the electronic safety actuators 100, 200 are in each case positioned above the safety brake 204 and the safety brake 204 is actuated by the magnetic plate 104 pulling upwards on the linkage 136. However, electronic safety actuators in accordance with the present disclosure may be used with safety brakes that are actuated by a linkage that is pushed to engage the safety brake.

In some example arrangements that are variations on the examples of FIGS. 3A to 3C and 4, a safety brake that is actuatable by pushing a linkage is provided with an electronic safety actuator as depicted in FIGS. 3A to 3C and 4. In the variations, the positions of the electronic safety actuator 100, 200 and the safety brake are swapped as compared with the positions shown in FIGS. 3A to 3C and 4. The magnetic plate 104 is connected to the linkage of the safety brake so that when the magnetic plate 104 moves upwards under the biasing force of the spring 106, it pushes the linkage upwards to engage the safety brake.

It will be appreciated by those skilled in the art that the disclosure has been illustrated by describing one or more specific aspects thereof, but is not limited to these aspects; many variations and modifications are possible, within the scope of the accompanying claims.

What is claimed is:

1. A frictionless electronic safety actuator (100; 202) for use in an elevator system, comprising:

a magnetic plate (104);

an electromagnet (102);

a linkage (136) that is actuatable so as to move a safety brake (204) into frictional engagement with an elevator guide rail (206), wherein the linkage (136) is attached to the magnetic plate (104), and wherein the magnetic plate (104) is moveable between a first position in which the linkage (136) is actuated and a second position in which the linkage (136) is not actuated; and a biasing arrangement (106) arranged to apply a biasing force to the magnetic plate (104) to bias the magnetic plate (104) towards the first position;

wherein the electromagnet (102) is operable to selectively produce a magnetic force which acts upon the magnetic plate (104) in a first direction towards the electromagnet (102) and which is sufficient to overcome the biasing force to move the magnetic plate (104) away from the first position; and wherein the frictionless electronic safety actuator (100; 202) further comprises a path-constraining arrangement (112) that constrains a path of movement of the magnetic plate (104) such that, when the magnetic force acts upon the magnetic plate (104), the magnetic plate (104) is constrained such that the magnetic plate (104) moves from the first position to the second position along the path of movement, wherein the second position is displaced relative to the first position in a direction that has a component perpendicular to the first direction;

wherein the biasing arrangement (106) is arranged to apply the biasing force directly to the magnetic plate (104).

2. The frictionless electronic safety actuator (100; 202) of claim 1, wherein the path-constraining arrangement (112) comprises a stiff member (114), and wherein a first point (118) on the stiff member (114) is pivotally connected to a first pivot that is fixed relative to the magnetic plate (104) and a second point (122) on the stiff member (114) is pivotally connected to a second pivot (126) that is fixed relative to the electromagnet (102).

3. The frictionless electronic safety actuator (100; 202) of claim 1, wherein the path-constraining arrangement (112) may comprise two or more stiff members (114, 116), and wherein a first point (118, 120) on each stiff member (114, 116) is pivotally connected to a respective first pivot that is fixed relative to the magnetic plate (104) and a second point (122, 124) on each stiff member (114, 116) is pivotally connected to a respective second pivot (126, 128) that is fixed relative to the electromagnet (102).

4. The frictionless electronic safety actuator (100; 202) of claim 3, wherein the path-constraining arrangement (112) comprises first and second stiff members (114, 116), and wherein the first and second stiff members (114, 116) are arranged such that the first and second points (118, 122) on the first stiff member (114) and the first and second points (120, 124) on the second stiff member (116) are each located at a respective vertex of a parallelogram shape (130).

5. The frictionless electronic safety actuator (100; 202) of claim 1, wherein the first position and the second position are located such that the range of movement of the magnetic plate (104) when it moves between the first position and the second position corresponds to a range of movement of the linkage (136) required to actuate the linkage (136) and engage the safety brake (204) in use.

6. The frictionless electronic safety actuator (100; 202) of claim 1, wherein the first position and the second position are located such that when the magnetic plate (104) moves from the first position to the second position, it moves a component of distance x parallel to the first direction and a component of distance y perpendicular to the first direction, such that the ratio x:y is at least 1:1.

7. The frictionless electronic safety actuator (100; 202) of claim 1, wherein the biasing arrangement (106) comprises or consists of a resilient member.

8. The frictionless electronic safety actuator (100; 202) of claim 1, wherein the biasing force is a pulling force.

9. The frictionless electronic safety actuator (100; 202) of claim 1, wherein the linkage (136) is actuated by a movement perpendicular to the first direction or by a movement in a direction having a component perpendicular to the first direction so as to move the safety brake (204) into frictional engagement with the elevator guide rail (206).

10. The frictionless electronic safety actuator (100; 202) of claim 1, wherein the electromagnet (102) is operable to reverse the magnetic field in order to displace the magnetic plate (104) from the electromagnet (102) and/or to remove the magnetic field to allow the magnetic plate (104) to be displaced from the electromagnet (102) by the biasing arrangement (106).

11. The frictionless electronic safety actuator (100; 202) of claim 1, wherein the magnetic plate (104) comprises at least one permanent magnet (208).

12. A braking assembly (200) for an elevator car (16), comprising:

a frictionless electronic safety actuator (100; 202) as claimed in claim 1; and a safety brake (204);

wherein the linkage (136) is connected to the safety brake (204) such that when the linkage (136) is actuated, the safety brake (204) is moved into frictional engagement with an elevator guide rail (206) guiding movement of the elevator car (16).

13. A frictionless electronic safety actuator (100; 202) for use in an elevator system, comprising:

a magnetic plate (104);

an electromagnet (102);

a linkage (136) that is actuatable so as to move a safety brake (204) into frictional engagement with an elevator guide rail (206), wherein the linkage (136) is attached to the magnetic plate (104), and wherein the magnetic plate (104) is moveable between a first position in which the linkage (136) is actuated and a second position in which the linkage (136) is not actuated; and a biasing arrangement (106) arranged to apply a biasing force to the magnetic plate (104) to bias the magnetic plate (104) towards the first position;

wherein the electromagnet (102) is operable to selectively produce a magnetic force which acts upon the magnetic plate (104) in a first direction towards the electromagnet (102) and which is sufficient to overcome the biasing force to move the magnetic plate (104) away from the first position; and wherein the frictionless electronic safety actuator (100; 202) further comprises a path-constraining arrangement (112) that constrains a path of movement of the magnetic plate (104) such that, when the magnetic force acts upon the magnetic plate (104), the magnetic plate (104) is constrained such that the magnetic plate (104) moves from the first position to the second position along the path of movement, wherein the second position is displaced relative to the first position in a direction that has a component perpendicular to the first direction;

wherein the magnetic plate (104) is oriented in a plane perpendicular to the first direction, and wherein the magnetic plate (104) substantially or fully overlaps with the electromagnet (102) both when the magnetic plate (104) is in the first position and when the magnetic plate (104) is in the second position.

14. A frictionless electronic safety actuator (100; 202) for use in an elevator system, comprising:

a magnetic plate (104);

an electromagnet (102);

a linkage (136) that is actuatable so as to move a safety brake (204) into frictional engagement with an elevator guide rail (206), wherein the linkage (136) is attached to the magnetic plate (104), and wherein the magnetic plate (104) is moveable between a first position in which the linkage (136) is actuated and a second position in which the linkage (136) is not actuated; and a biasing arrangement (106) arranged to apply a biasing force to the magnetic plate (104) to bias the magnetic plate (104) towards the first position;

wherein the electromagnet (102) is operable to selectively produce a magnetic force which acts upon the magnetic plate (104) in a first direction towards the electromagnet (102) and which is sufficient to overcome the biasing force to move the magnetic plate (104) away from the first position; and wherein the frictionless electronic safety actuator (100; 202) further comprises a path-constraining arrangement (112) that constrains a path of movement of the magnetic plate (104) such that, when the magnetic force acts upon the magnetic plate (104), the magnetic plate (104) is constrained such that the magnetic plate (104) moves from the first position to the second position along the path of movement, wherein the second position is displaced relative to the first position in a direction that has a component perpendicular to the first direction;

wherein the linkage (136) is directly attached to the magnetic plate (104).

* * * * *